Dec. 30, 1952        J. J. MADIGAN        2,623,753

TRACTOR-TRAILER COUPLING MECHANISM

Filed Sept. 29, 1950        2 SHEETS—SHEET 1

*INVENTOR.*
JOHN J. MADIGAN
BY
*ATTORNEYS*

INVENTOR.
JOHN J. MADIGAN
BY
*Ely & Frye*
ATTORNEYS

Patented Dec. 30, 1952

2,623,753

UNITED STATES PATENT OFFICE 2,623,753

TRACTOR-TRAILER COUPLING MECHANISM

John J. Madigan, Akron, Ohio, assignor of one-half to Ples M. Thomas, Akron, Ohio Application September 29, 1950, Serial No. 187,457

4 Claims. (Cl. 280—33.05)

The present invention relates to coupling mechanisms such as commonly employed to couple tractors and trailers used in highway transportation, the object of the invention being to provide a mechanism of this character which can be uncoupled by power provided from the tractor. It is a further object of the invention to devise a practical device of the character stated which is safe and cannot be accidentally uncoupled in service.

Mechanisms have been suggested for the general purpose stated, but because of impractical features of such devices, and so far as the actual commercial operations are concerned, none of these devices has been adopted and used. Prior to the activities of the present applicant, all coupling devices of the type set forth herein have required that the truck operator manually uncouple the tractor and trailer.

Tractor-trailer assemblies of the type in almost universal use are connected by a large pin, known as the king pin, which is located on the forward end of the trailer, to be received in a slot opening rearwardly of the so-called fifth wheel, which is pivotally mounted on the body or deck of the tractor. While many different forms of coupling mechanisms have been devised for holding the king pin in coupled relation to the fifth wheel, they have in common the provision of a pivoted hook or grapple which is located on the fifth wheel so that when the two units are separated, the hook is adjacent to but clears the slot in the fifth wheel. When the tractor is backed under the forward end of the trailer, the king pin is engaged by the hook. Usually, a spring operated latch holds the hook in position and, as far as known, all commercial installations are provided with manually operated handles, which must be operated by the truck driver to release the hook, whereupon the hook springs out of place, freeing the king pin.

The objection to the usual type of uncoupling devices is that they must be manually operated to release the coupling. This means that the operator must reach under the forward end of the trailer, which places him in a dangerous position. It also frequently occurs that the pressure on the king pin is sufficient to hold the hook or grapple from springing out of engagement with the pin, and when this occurs the operator must either block the handle while he gets into the tractor cab to move the tractor to loosen the pin and hook, or he must get another operator to move the tractor while he holds the release handle, which is dangerous.

The invention consists in combining a standard coupling mechanism with a power operated release mechanism which will move the detent which holds the hook out of engagement with the hook to permit the hook to spring out of engagement with the king pin. For this purpose, the mechanism employed is of the pressure (or vacuum) operated type so that the driver may operate the release mechanism directly from the cab, using the same fluid pressure controls which normally operate the brakes on the trailer. All commercial trailers are equipped with brakes which are operated either upon the pressure or vacuum system, and the mechanism is so designed that the driver may connect the release mechanism with the pressure or vacuum line while the tractor is standing.

One of the advantages of using the regular pressure or vacuum lines for operating the release mechanism is that the driver, in making the connection to the releasing devices, has to disconnect the pressure or vacuum line from the trailer. It is not an infrequent occurrence for the driver to disconnect the king pin coupling and then start up the tractor without uncoupling the power lines to the trailer. By using the same power line for the coupling release as is used for the trailer, the driver will not overlook disconnecting these power lines.

It is also very essential that the release mechanism for the hook or grapple shall not, under any conditions, operate to release the hook accidentally or while the tractor-trailer combination is in transit. It is therefore an object of the present invention to devise a mechanism which cannot accidentally release the hook and the king pin.

While there are several different types of fifth wheels and coupling mechanisms in common use, the invention is so designed that, with slight variations, it may be adapted to any of the more commonly employed devices of this character. In the drawings and specification, there are disclosed two types of coupling mechanisms more commonly employed, with the invention applied thereto. The disclosure makes evident the manner in which the invention may be adapted to any type of coupling mechanisms.

Tractor - trailer combinations are usually equipped with pressure or vacuum systems to operate the brakes of the tractor and trailer from the cab and the invention is designed so that the uncoupling mechanism will be actuated by such systems. While vacuum systems have been used to a certain extent, the prevailing practice at the present time is to use pressure systems and hence the devices are shown as operated by such a system, although it may be modified for use with a vacuum system. The utilization of pressure (or vacuum) systems found in tractor-trailer equipment affords a ready means of uncoupling the king pin and the hook, but as noted above, such a procedure makes it necessary in the present invention to provide uncoupling means which will not act if the pressure (or vacuum) system fails, as it sometimes does. Otherwise, the trailer might release itself from the tractor, with disastrous results.

The present application is a continuation in part of the prior application of this applicant, Serial No. 125,203, filed November 3, 1949, now abandoned.

It will be understood that while the invention is shown and described as applied to two forms of tractor-trailer coupling mechanisms, the invention is not limited to these forms but may be applied to other forms. Other changes and modifications may be employed without departing from the invention. It is also to be understood that hereinafter where the word "pressure" is employed in the specification or claims, this term is understood to refer to either type of differential pressure systems, i. e. either to a vacuum system or to a super-atmospheric pressure system.

Figure 1:
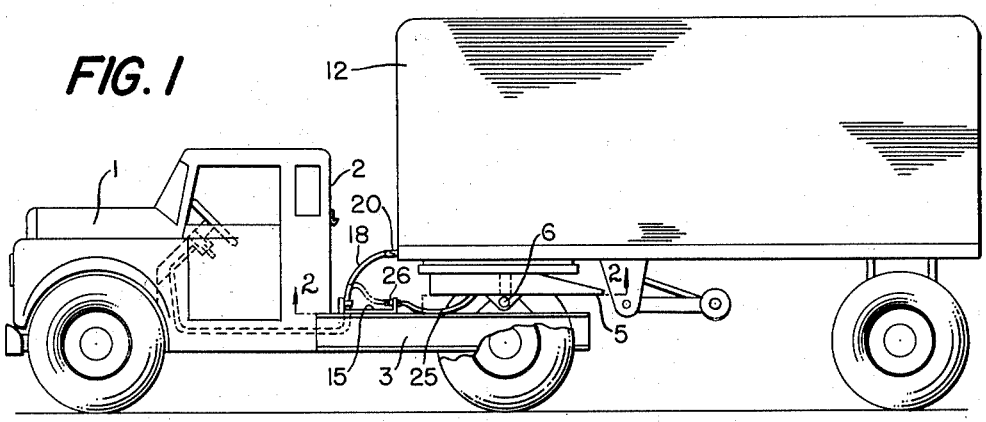
Fig. 1 shows a side elevation of a tractor-trailer assembly of a standard type to which the invention has been applied.
Figure 3:
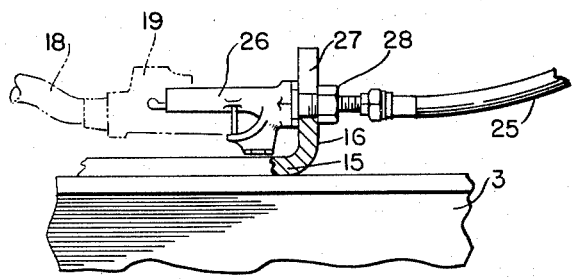
Fig. 3 is a side view of the arrangement used with all types of fifth wheels, by which the uncoupling mechanism is connected to the fluid pressure (or vacuum) system of the tractor.

Referring first to Figs. 1 and 3, a tractor of any standard type is indicated by the numeral 1. It has the cab 2 and the rearwardly extending frame 3, on which the fifth wheel 5 is pivotally mounted as at 6 so that it normally will tilt downwardly at its rear end when the tractor and trailer are uncoupled. In all standard types of fifth wheels there is provided the rearwardly opening and flared slot 8 for the entrance of the king pin 10, which, as the tractor moves beneath the forward end of the trailer 12, moves into position at the forward and reduced portion of the slot 8.

At the rear of the cab, on the frame 3, is usually found a transversely extending deck 15, which is commonly a channeled beam with an upstanding flange 16. The tractor and the trailer are connected by power lines, which carry current to the trailer. These are not shown as they are common to all tractor-trailer combinations. There is also provided a flexible hose which conveys the pressure from the tractor to the trailer for operation of the brakes. Such a line is shown at 18. It extends from a location in the cab, where the brakes are operated, to a point in the rear of the cab and is provided with one member 19 of a mating detachable coupling. On the front end of the trailer is mounted a mating coupling 20, by which the pressure systems in the two units are connected.

In both embodiments of the invention, the uncoupling device is operated by the same pressure system. There is therefore provided a flexible extension 25 which leads to the fifth wheel, the forward end of which is equipped with a mating coupling 26 adapted to be connected to the coupling 19 on the main pressure line 18. The forward end of the line 25 is shown as mounted in a slot 27 in the flange 16 on the deck 15. This location is chosen for convenience and may be at any point so that the operator may make the connection between the couplings 19 and 26 after he disconnects the coupling 19 from the coupling 20.

This is an important feature in the invention because it requires the operator to uncouple the pressure line to the trailer in order to uncouple the tractor and the trailer. This operation not only sets the brakes on the trailer but it also insures that the line 18 has been disconnected from the trailer before the tractor can be separated from the trailer. Not only does this insure that the pressure connection between tractor and trailer shall be uncoupled but, as the operator is between the tractor and trailer when shifting the pressure connections, he will also be in position to and will uncouple the electric power lines as well. It was not an infrequent occurrence, in the old type devices, for the truck operator to be careless in this respect and, after manually uncoupling the tractor and trailer, to neglect to uncouple the pressure lines and the power lines. By making it necessary to uncouple the pressure lines before uncoupling the two vehicles, damage is prevented to the tractor-trailer connection.

In Fig. 1, the line 18 is shown by full lines in the position it occupies while the tractor and trailer are connected. The dotted lines show the position to which the line 18 is shifted for the uncoupling operation.

Figure 2:
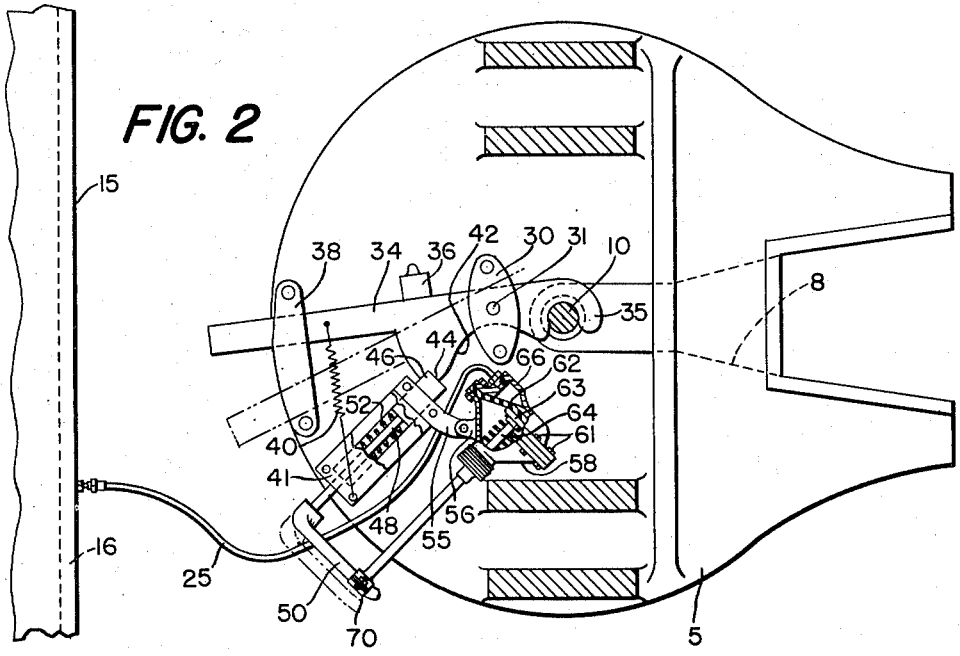
Fig. 2 is a section on the line 2—2 of Fig. 1, looking at the underside of a fifth wheel and coupling of the type known in the trade as the "Fruehauf" type of coupling.

Referring to Fig. 2, in which the "Fruehauf" type of coupling is shown: On the underside of the fifth wheel is secured the bridge piece 30 to which is pivoted, at 31, a long lever arm 34, the rear end of which is provided with the hook 35 which is movable over the inner end of slot 8 to engage and hold king pin 10. In coupled relation, the arm 34 is as shown in full lines, one side of the arm bearing against a stop 36 and the outer end of the arm extending beyond the fifth wheel where it is accessible to the operator for manual operation of the coupling. The outer end of arm 34 is guided by a plate 38, which overlies the arm and is attached to the fifth wheel.

A heavy coil spring 40, attached at one end to the lever arm 34 and at the other end to a housing 41 on the fifth wheel, tends to move the lever arm out of engaged position with the king pin. The side of the lever arm is provided with an enlargement 42 in one corner of which is a square notch 44.

The lever arm and the king pin are held in coupling engagement against the force of the spring 40 and against any tendency toward accidental disengagement of the hook and the king pin by the square head 46 on the inner end of a long rod 48, which is slidably mounted in the housing 41 and extends outwardly beyond the perimeter of the fifth wheel, where it is provided with a handle 50 by which the bolt 48 may be manually withdrawn to free the head 46 from the notch 44 and permit the lever arm 34 to swing to the dotted line position shown in Fig. 2, to release the coupling between the tractor and the trailer.

Located in the housing 41 and bearing at one end on the head 46 and at the other on the far end of the housing, is a heavy coil spring 52. This spring operates to move the head 46 into the notch 44 and it also helps to hold these parts in engagement should the pressure or vacuum system fail for any reason.

Secured to the housing 41 is a bracket 55 which extends beyond the housing and is connected at its outer end to a lug 56, attached to one section of a hollow diaphragm chamber 58 of the power operating means for releasing the coupling. This power operating unit is the same for all types of couplings and is shown in greater detail in Fig. 5. It will be understood that while the chamber is shown as adapted to super-atmospheric pressure operations, by appropriate reversal of the parts it may be adapted to vacuum operation.

The diaphragm chamber is completed by a second dome-shaped section 60 and, between these two sections, the flexible diaphragm 62 is clamped by the bolts 61. The pressure line 25 is connected to the section 60. Bearing against the opposite side of the diaphragm is the disk-shaped plate 63, which is mounted on the end of a rod 64 passing through a bushing 65 in the dome of the chamber section 58. At the top of the section 58 the rod 64 is attached to a bellows-like diaphragm 67. Surrounding the bushing 65 and the rod 64, and bearing against the disk 63, is a coil spring 69, which exerts a pressure, tending to hold the rod 64 in its outer position. The spring 69 is an important feature of the installation because it prevents any drifting of the rod 64 toward opening position.

Referring particularly to the "Fruehauf" type coupling shown in Fig. 2, the rod 64 is extended outwardly to the handle 59, to which it is secured by the clamp 70.

It will be seen that when the tractor-trailer combination is in service, the line 25 is open and the locking block is held in its seat 44 in the hook by the springs 52 and 69. Hence, it is impossible for the hook to release itself from engagement with the king pin. Were the locking device for the hook held in engaged position by pressure derived from the pressure system, any failure of the system due to breakage or leaks in the line, or from other causes, would permit the locking device to work itself free of the hook, due to the vibrations while in service. Separation of the line 25 from the balance of the pressure system also prevents the truck driver from accidentally or intentionally releasing the connection between the tractor and trailer while in service. This safety feature is absolutely essential to all types of couplings. If it were at all possible for the coupling to free itself for any reason while the vehicle was in motion, the installation would be condemned as unsafe. If the trailer could become disconnected while the vehicle is moving, the results would be disastrous.

Figure 4:
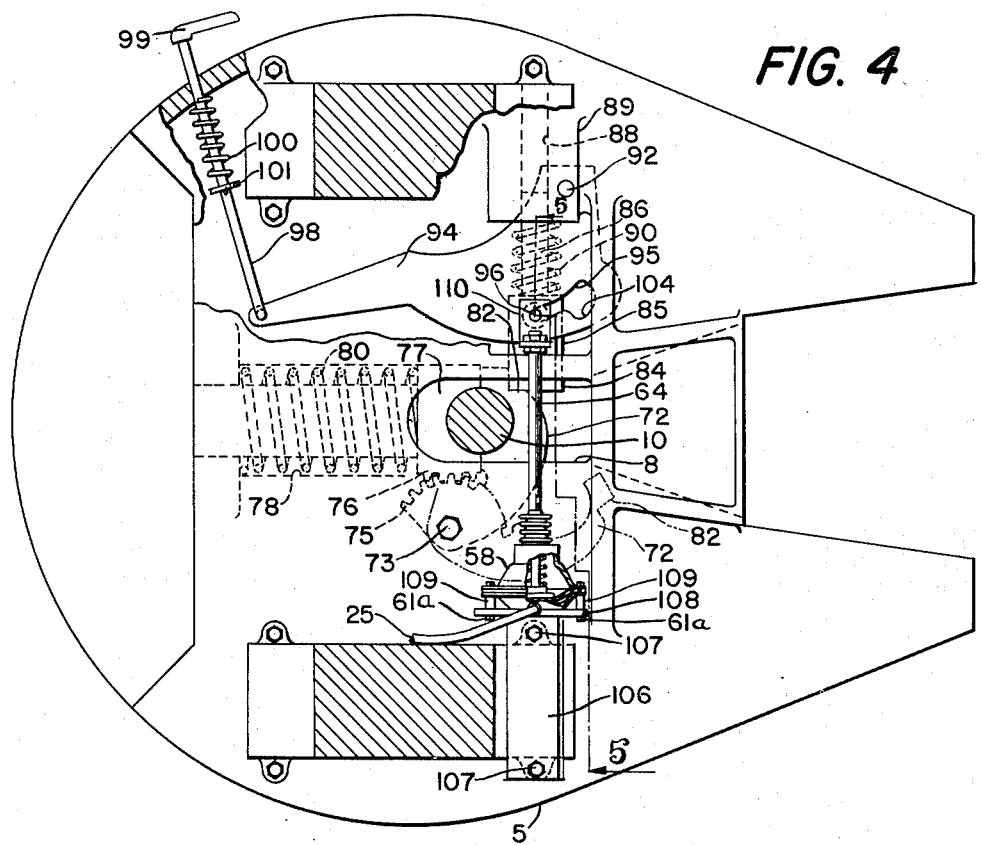
Fig. 4 is a view similar to Fig. 2, but showing the invention applied to what is called in the trade the "Holland" type fifth wheel. This view is taken on the line 4—4 of Fig. 5.
Figure 5:
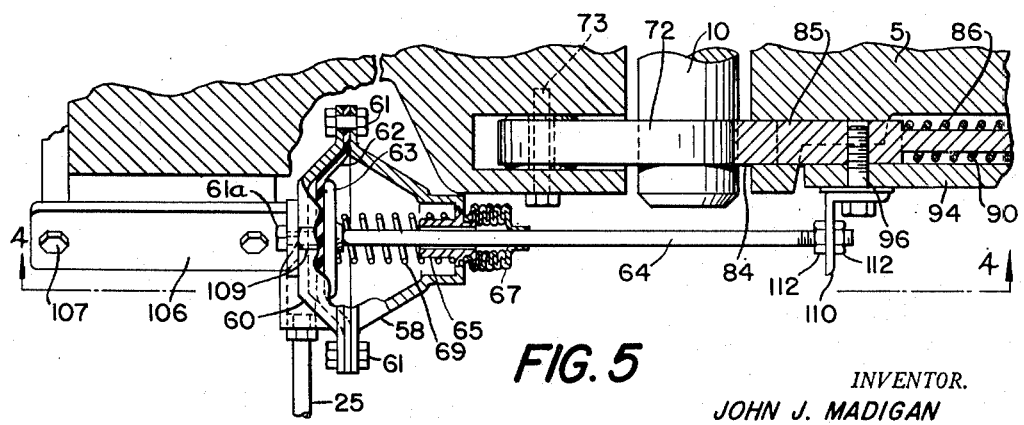
Fig. 5 is a section on the line 5—5 of Fig. 4.

Referring now to Figs. 4 and 5, in which like parts are given like reference numerals, the "Holland" type coupling is provided with a swinging latch or hook 72, shown in full lines in coupling position engaging the king pin 10 in the slot 8 in the fifth wheel 5. Dotted lines show the uncoupled position of the hook 72. Hook 72 is pivoted at 73 on the fifth wheel and is provided on its inner end with a curved rack 75, which meshes with a rack 76 formed on the side of a block 77, slidably mounted in a guideway 78 on the underside of the fifth wheel. A heavy coil spring 80 urges the block 77 rearwardly of the fifth wheel. As the tractor backs under the trailer, the king pin 10 moves the block 77 to the left, as shown in Fig. 4, and swings the hook 72 into its full line position engaging the king pin.

The hook 72 is provided with a notch 82, which, as the hook moves inwardly, is engaged by the square head 84 of a locking block 85, slidably mounted in the fifth wheel 5. Extending from the block 85 is a rod 86, the outer end of which is guided in a bore 88 in a housing 89, which is a part of the fifth wheel. A heavy coil spring 90 surrounds the rod 86 and bears against the head of the block 85 and the housing 89, and thus tends to hold the block 85 in its outermost position.

Pivoted at 92 on the housing 88 is the rocking cam lever 94, in which is located the cam slot 95. A stud 96 is threaded into the block 85 and the shank of the stud is received in the slot 95. For manual operation the lever 94 is extended toward the front of the fifth wheel, where it is pivotally connected to an operating rod 98, the outer end of which passes through the fifth wheel and is provided with a handle 99. A coil spring 100 surrounds the rod 98 and bears against the inner surface of the fifth wheel and against a ring 101, pinned to the rod 98.

It will be seen that when the lever 94 is rocked outwardly about its pivot 92, the stud 96 will withdraw the locking block 85 from engagement with the notch 82, which will permit the hook 72 to move to open position when the tractor is moved outwardly from the trailer. A recess 104 is provided in the cam slot 95 in which the stud 96 will rest when the block is moved outwardly and will serve to hold the block in its outer position. As the tractor is backed under the forward end of the trailer, the end of the hook 72 will press the block outwardly until the stud 96 is released from the notch 104, whereupon continued movement of the hook will bring the notch 82 and the end of the block in register, and the block will then occupy its locked position.

To provide for the power uncoupling operation, the diaphragm chamber 58—60 is attached to the underside of the fifth wheel by a bracket 106 clamped to the fifth wheel by bolts 107 and provided with a transverse plate 108 which is secured to the diaphragm chamber by substituting for two of the bolts 61 elongated bolts 61a and surrounding the bolts with spacing sleeves 109.

The rod 64 in this case is attached at its outer end to an angle bracket 110, one arm of which is received and clamped over the projecting end of the stud 96 and the other arm of which is secured to the rod 64 by the lock nuts 112 threaded onto the rod. When pressure is admitted to the diaphragm chamber, after coupling the line 25 in the same manner as in the "Fruehauf" type, the block 85 will be moved outwardly and this action will rock the lever arm 94 until the stud 96 enters the notch 104.

It will be seen that the embodiments of the invention have in common a locking block or keeper which is spring pressed in locking position with respect to the pivoted hook which engages the king pin. Associated with these elements is a separate pressure chamber in which is located a pressure operated diaphragm rod which is attached, at its outer end, to a second rod which is connected directly to the locking block. A second spring element associated with the diaphragm rod acts to hold the diaphragm rod and the rod connected to the locking block in position to maintain the keeper in engagement with the hook. By this combination of elements, it is assured that the hook is at all times held in locking position with the king pin while the tractor-trailer is in service.

The embodiments of the invention also have in common the feature that the pressure operated mechanism which uncouples the tractor-trailer is wholly separated from the pressure system in the tractor-trailer while the vehicles are in transit and that the pressure operated mechanism can be put in use only by disconnecting the main pressure line from the cab at the trailer and transferring it to the auxiliary pressure line which leads to the said pressure operated mechanism. Such an operation can be done only while the vehicles are stationary.

What is claimed is:

1. In a tractor-trailer assembly having a fluid conduit on the tractor with a fitting releasably connected to a conduit on the trailer leading to the trailer brakes, a fifth wheel comprising a king pin, a latch for the king pin and a manual operating rod for removing the latch from engagement with the king pin, the improvement comprising an auxiliary operating rod adapted to move said latch, a pressure housing receiving an end of said rod and having a diaphragm adapted to urge said rod to latch releasing position, a fluid conduit connected to said housing, and a fitting on the outer end of said latter conduit fixed to the tractor frame outside of the tractor cab and connectible with the first-mentioned fitting only when it is disconnected from the conduit leading to the trailer brakes.

2. In a tractor-trailer assembly having a fluid conduit on the tractor with a fitting releasably connected to a conduit on the trailer leading to the trailer brakes, a fifth wheel comprising a king pin, a latch for the king pin and a manual operating rod for removing the latch from engagement with the king pin, the improvement comprising an auxiliary operating rod adapted to move said latch, a pressure housing receiving an end of said rod and having a diaphragm adapted to urge said rod to latch releasing position, a bracket on the frame of said tractor outside of the tractor cab, a conduit connector fixed on said bracket, a conduit connected between said housing and said connector, and said connector having a fitting selectively connectible with said first mentioned fitting only when it is disconnected from the conduit leading to the trailer brakes.

3. In a tractor-trailer assembly having a fluid conduit on the tractor with a fitting releasably connected to a conduit on the trailer leading to the trailer brakes, a fifth wheel comprising a king pin, a latch for the king pin and a manual operating rod for removing the latch from engagement with the king pin, the improvement comprising an auxiliary operating rod adapted to move said latch, a pressure housing receiving an end of said rod and having a diaphragm adapted to urge said rod to latch releasing position, a spring surrounding said rod internally of said housing and urging said rod against said diaphragm, said rod being connected to said latch, a fluid conduit connected to said housing, and a fitting on the outer end of said latter conduit fixed to the tractor frame outside of the tractor cab and selectively connectible with the first mentioned fitting only when it is disconnected from the conduit leading to the trailer brakes.

4. In a tractor-trailer assembly having a fluid supply conduit on the tractor with a fitting on its rear end normally releasably connected to the conduit on the trailer leading to the trailer brakes, a fifth wheel comprising a king pin, a latch for the king pin and a manual operating rod for disengaging the latch, the improvement comprising a fluid pressure housing having fluid operated means connected to said rod to move it to latch releasing position, a second fluid conduit having one end connected to said housing, and a fitting on the other end of said second conduit fixed to the tractor frame outside of the tractor cab and connectible with said fluid supply fitting only when the fluid supply fitting is disconnected from the conduit leading to the trailer brakes.

JOHN J. MADIGAN.

REFERENCES CITED

The following references are of record in the file of this patent:

UNITED STATES PATENTS

| Number | Name | Date |
|---|---|---|
| 2,282,414 | Black | May 12, 1942 |
| 2,471,854 | Bies et al. | May 31, 1949 |